W. H. BEAN.
CORN HARVESTER ATTACHMENT.
APPLICATION FILED DEC. 19, 1910.
998,150.
Patented July 18, 1911.
2 SHEETS—SHEET 1.
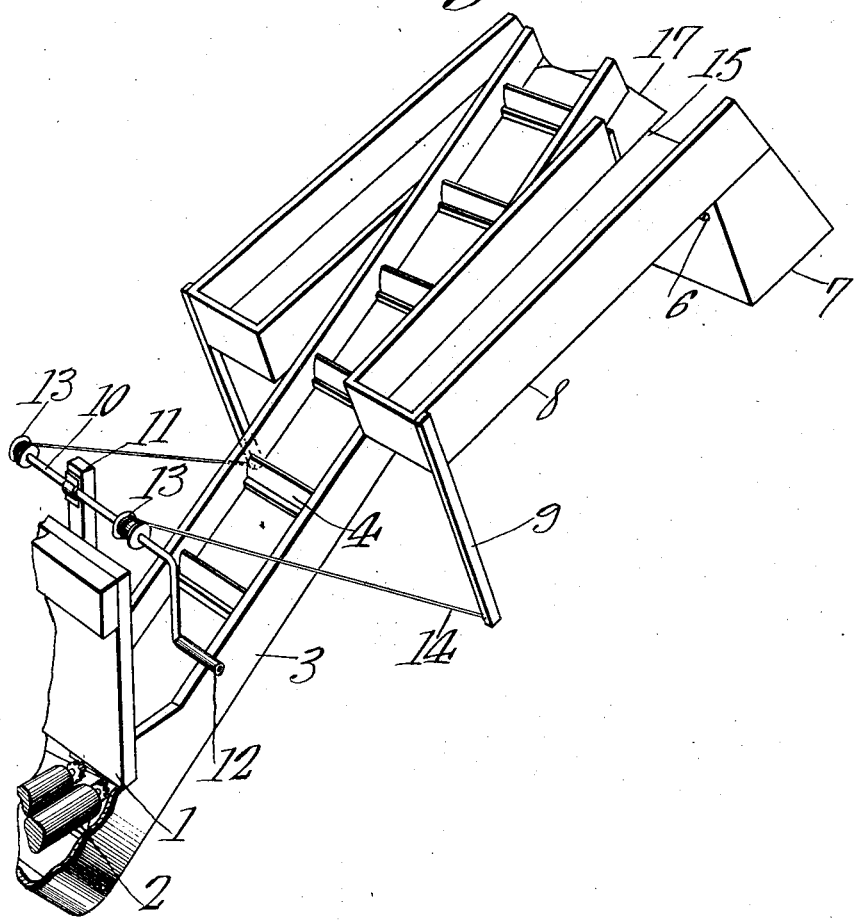

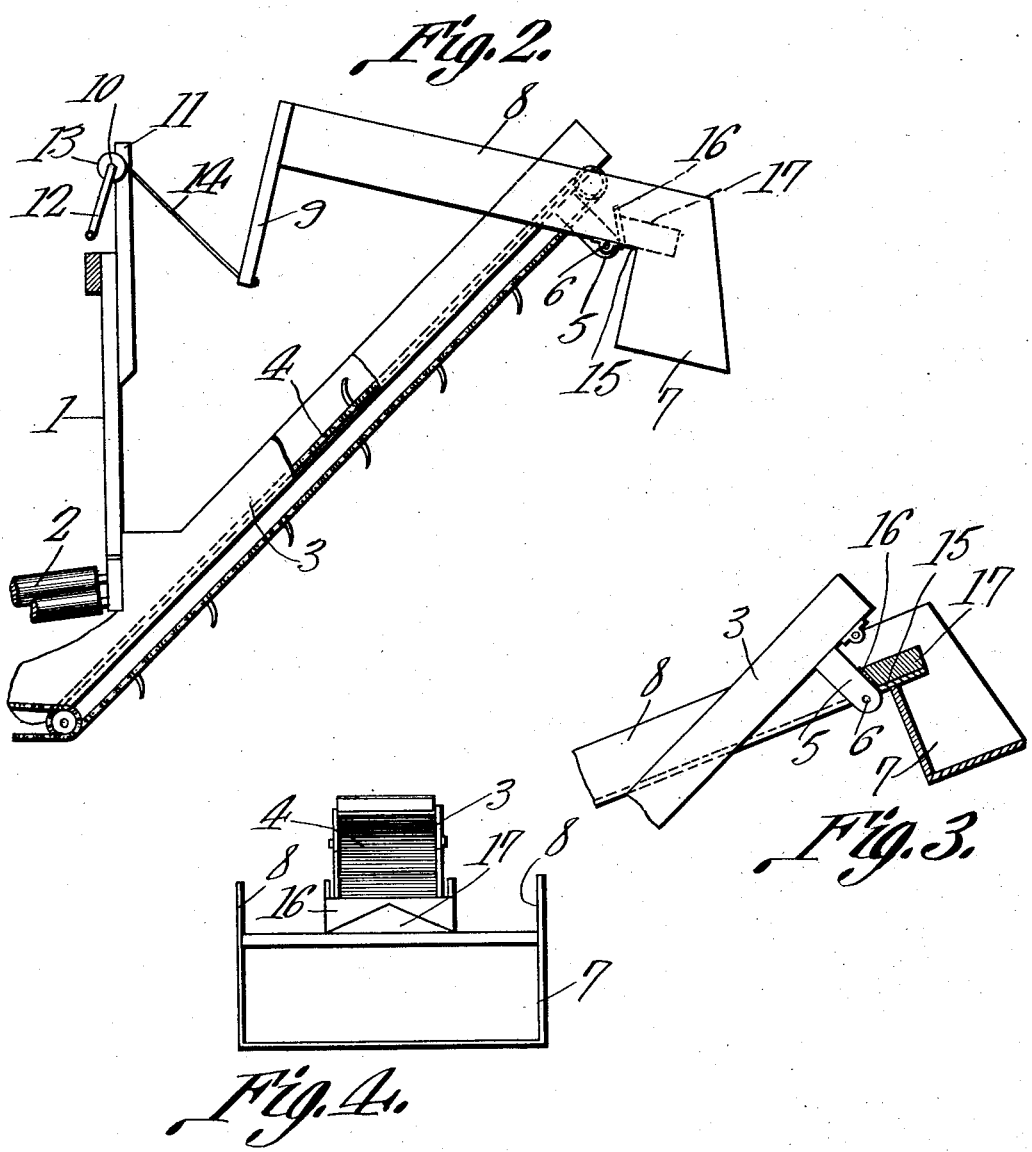

UNITED STATES PATENT OFFICE.

WILLIAM H. BEAN, OF BLUE MOUND, ILLINOIS.

CORN-HARVESTER ATTACHMENT.

998,150.  Specification of Letters Patent. Patented July 18, 1911.

Application filed December 19, 1910. Serial No. 598,085.

*To all whom it may concern:*

Be it known that I, WILLIAM H. BEAN, a citizen of the United States, residing at Blue Mound, in the county of Macon and State of Illinois, have invented a new and useful Corn-Harvester Attachment, of which the following is a specification.

This invention has relation to attachments for corn harvesters and consists in the novel construction and arrangement of parts as hereinafter described and claimed.

The object of the invention is to provide an attachment in the form of a receptacle adapted to be applied to the frame of a corn harvester together with an elevating means for carrying the ears of corn as they are removed from the standing stalks to the said receptacle.

When the corn harvester arrives at the end of a row the receptacle may be emptied and inasmuch as it is in an elevated position upon the frame of the harvester, its contents may be permitted to dump into the body of a wagon or other receptacle.

In the accompanying drawings:—Figure 1 is a perspective view of the attachment. Fig. 2 is a side elevation of the same. Fig. 3 is a sectional view of a portion of the same. Fig. 4 is an end view of the same.

Inasmuch as the attachment may be applied to the frame of a corn harvester of any design or pattern only so much of the frame and the working parts of the harvester will be illustrated and described to enable those skilled in the art to understand the operation of the parts of the attachment.

As shown in the drawing the harvester frame is indicated at 1 and the husking or snapping rolls at 2. An elevator trunk 3 is connected at one end with the frame 1 and has its receiving end located under the delivery end of the husking or snapping rolls 2. An endless conveyer 4 is mounted for movement along the trunk 3 in the usual manner and derives its movement from moving parts of the corn harvester in any desired manner. Arms 5 are rigidly secured to the outer upper portions of the sides of the trunk 3 and extend in a downward direction. A shaft 6 is journaled in the lower end portions of the arms 5 and extends transversely under the upper outer portion of the trunk 3. A receptacle 7 is mounted upon the shaft 6 and extends transversely under the upper outer portion of the trunk 3 and projects to some extent beyond the sides of the said trunk. Wings 8 are connected at their outer ends with the projecting end portion of the receptacle 7 and the said wings extend back along the sides of the trunk 3. Downwardly disposed arms 9 are fixed to the outer sides of the rear portions of the wings 8. A shaft 10 is journaled upon a standard 11 which in turn is mounted upon the frame 1 and is provided at one end with a crank handle 12. Drums 13 are fixed to the shaft 10 and cables 14 are arranged to wind upon the said drums. The outer ends of the said cables 14 are connected with the lower ends of the arms 9. The shaft 10 is located at such an elevation that when the cables 14 are wound upon the drums the lower ends of the arms 9 will be drawn toward the said shaft and the inner ends of the wings 8 will be raised so that they will be elevated above the level of the shaft 6 and the contents of the said wings 8 as well as the contents of the receptacle 7 may roll or tumble in an outward direction from the corn harvester and thus the parts of the attachment are moved to dumping position. A ledge 15 extends inwardly from the upper edge of the inner side of the receptacle 7 and a flange 16 is mounted upon the inner edge of the said ledge.

When the receptacle 7 and the wings 8 are in position to receive the ears of corn the flange 16 is against the outer edges of the arms 5 but when the receptacle 7 and the wings 8 are tilted to dumping position the flange 16 is moved away from the outer edges of the said arms. Thus the said flange serves as a stop device for limiting the pivotal movement of the receptacle 7 and its attachments. A deflector block 17 is located upon the ledge 15 immediately under the delivery end of the trunk 3 and the said block is provided with an upper surface so inclined as to distribute or deflect the ears of corn as they come from the upper end of the trunk 3 into the side wings 8. When the wings 8 have been filled with the ears to such an extent that the ears begin to roll back over the upper edges thereof the said ears will roll down into the receptacle 7 and as the ears accumulate in the said receptacle their weight will counter-balance the weight of the ears in the wings and thus the said receptacle together with its wings will be balanced more or less upon the shaft 6. By making provision for balancing the receptacle and wings the said receptacle and wings may be more easily moved to dumping position at the end of the row.

Having described the invention what I claim as new and desire to secure by Letters Patent is:—

1. A harvester attachment comprising an elevator, a receptacle pivotally connected with the elevator and located below the delivery end of the same, receptacle wings connected with the said receptacle and extending along the sides of the elevator and means mounted upon the harvester for tilting the receptacle and receptacle wings.

2. In combination with a harvester, an elevator, a receptacle pivoted to the elevator and located below the delivery end thereof, receptacle wings attached to said receptacle and extending along the sides of the elevator, means mounted upon the harvester for tilting the receptacle and the receptacle wings and a deflector located at the edge of the receptacle and between the receptacle wings and below the delivery end of the elevator.

3. In combination with a harvester, an elevator, a receptacle pivotally connected to the elevator and located below the delivery end thereof, a stop device carried by the receptacle and adapted to engage the elevator to limit the swinging movement of the said receptacle in one direction, receptacle wings connected with the said receptacle and extending along the sides of the elevator and means mounted upon the harvester for tilting the receptacle and the receptacle wings.

4. In combination with a harvester, an elevator, a receptacle pivoted thereto and located below the delivery end thereof, wings connected with the said receptacle and extending transversely across the pivotal point thereof and extending along the sides of the elevator, arms attached to the inner portions of the wings, a shaft journaled upon the frame of the harvester and cables arranged to wind about the shaft and connected with said arms.

In testimony that I claim the foregoing as my own, I have hereto affixed my signature in the presence of two witnesses.

WILLIAM H. BEAN.

Witnesses:
CHARLES F. CROW,
JAMES A. MCCLURE.

---

Copies of this patent may be obtained for five cents each, by addressing the "Commissioner of Patents, Washington, D. C."